United States Patent [19]
Kim

[11] Patent Number: 6,031,961
[45] Date of Patent: *Feb. 29, 2000

[54] DEVICE AND METHOD FOR OUTPUTTING RECORDED INFORMATION AS A VOICE MESSAGE IN PROGRAMMED RECORDING SYSTEM USING TRANSMITTED SCHEDULE DATA

[75] Inventor: Yong-ho Kim, Bucheon, Rep. of Korea

[73] Assignee: Samsung Electronics Co., Ltd., Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/784,517

[22] Filed: Jan. 17, 1997

[30] Foreign Application Priority Data

Jan. 17, 1996 [KR] Rep. of Korea .......................... 96-868

[51] Int. Cl.$^7$ ...................................................... H04N 5/76
[52] U.S. Cl. .................................. 386/83; 386/95; 386/69
[58] Field of Search .................................. 386/46, 83, 95, 386/69, 65, 96, 87; 348/468, 906; H04N 5/76

[56] References Cited

U.S. PATENT DOCUMENTS

| | | | |
|---|---|---|---|
| 4,890,168 | 12/1989 | Inoue et al. | 386/69 |
| 5,097,348 | 3/1992 | Suetaka | 386/95 |
| 5,390,027 | 2/1995 | Henmi | 386/83 |
| 5,450,210 | 9/1995 | Yoo | 386/95 |
| 5,543,933 | 8/1996 | Kang et al. | 386/83 |
| 5,677,739 | 10/1997 | Kirland | 348/468 |

*Primary Examiner*—Huy Nguyen
*Attorney, Agent, or Firm*—Dilworth & Barrese

[57] ABSTRACT

A device and method to output recorded program schedule information as a voice message in a programmed recording system using transmitted schedule data. The device includes a video reproducing portion for playing back a tape which stores a video signal having the schedule data and outputting a composite video signal, a schedule data processing portion for separating the schedule data from the video signal output from the video reproducing portion and decoding the separated data, a conversion portion for converting the separated schedule data into a voice signal, a speaker for outputting the voice signal, and a microcomputer controller for controlling the schedule data processing portion and the voice combining portion. The method includes the steps of positioning a tape at a starting position; sensing a video index search system (VISS) signal recorded on the tape, reproducing a video signal recorded on the tape at normal speed when the VISS signal is sensed, separating the schedule data from the reproduced video signal and extracting the schedule data, and converting and outputting the extracted schedule data as a voice message. Accordingly, a user can easily confirm recording information such as the title of a program, the broadcast station identification (ID) of the program, the recording date and time.

12 Claims, 3 Drawing Sheets

DEVICE AND METHOD FOR OUTPUTTING RECORDED INFORMATION AS A VOICE MESSAGE IN PROGRAMMED RECORDING SYSTEM USING TRANSMITTED SCHEDULE DATA

BACKGROUND OF THE INVENTION

The present invention relates to a method and device to output recorded information as a voice message using transmitted schedule data. More particularly, the invention relates to a method and device to output schedule information recorded on a tape as a voice message using data transmitted during a vertical blanking section of a video frame of a broadcast signal.

In a conventional programmed recording method, a user obtains the broadcast schedule of a desired program to be recorded by referring to a listing published in newspapers and magazines. Based on these listings, the user inputs the recording schedule in a recording device through a program recording menu, thereby setting up for the recording of the desired broadcast. Also, there is a VCR-Plus method in which the schedule information of coded broadcast programs is input by referring to a code number obtained from a newspaper listing to set up the programmed recording of a desired broadcast.

In an improved programmed recording method, which is similar to a video program system (VPS), when a broadcast station broadcasts data (schedule data), digital information relating to the program scheduling is coded in every predetermined scan line located in a vertical blanking section of a video signal in each image frame. A VCR displays the programming schedule on a TV screen by decoding the schedule data of a particular channel, and a user easily programs recording of a particular program. The above-mentioned programmed recording method is called the Korea Broadcasting Program System (KBPS).

In the above programmed recording method, the user can see the program schedule information through the TV screen whenever he or she wants, can select the program to be recorded by a simple manipulation, and can perform the programmed recording of the selected program.

The schedule data extracted by signal-processing a radio frequency (RF) signal received from the broadcast station has been used only for programmed recording. However, various other uses for the transmitted schedule data have not been utilized.

SUMMARY OF THE INVENTION

It is an object of the present invention to provide a device for outputting recorded information as a voice message for announcing information about programs recorded in a schedule data programmed recording system without turning on a TV set.

It is another object of the present invention to provide a method for outputting recorded information as a voice message for announcing information of programs recorded in a schedule data programmed recording system without turning on a TV set.

To achieve the first object, there is provided a device to output program information recorded on a tape as a voice message in a programmed recording system using schedule data transmitted in a vertical blanking interval of a video frame according to the present invention. The device comprises a video reproducing portion for playing back a tape which stores a video signal having the schedule data and for outputting a composite video signal, a schedule data processing portion for separating the schedule data of the composite video signal output from the video reproducing portion and decoding the separated schedule data, a voice conversion portion for converting the decoded schedule data output from the schedule data processing portion into a voice signal, a speaker for outputting the combined voice signal from the voice conversion portion, and a microcomputer controller for controlling the schedule data processing portion and the voice conversion portion.

To achieve the second object of the present invention, there is provided a method to output program schedule information recorded on a tape as a voice message in a programmed recording system using schedule data transmitted in a vertical blanking interval of a video frame according to the present invention. The voice outputting method comprises positioning a tape at a starting position by performing a fast rewinding operation, for example; performing a fast forward winding operation until a video index search system (VISS) signal recorded on the tape is sensed; reproducing a video signal recorded on the tape at normal speed when the VISS signal is sensed, separating the schedule data from the reproduced video signal and extracting the schedule data, and converting and outputting the extracted schedule data as a voice message. Accordingly, a user can easily confirm recording information such as the title of a program recorded on a tape, the broadcast station identification (ID) of the program, the recording date and time within a short period of time.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENT

Figure 1:
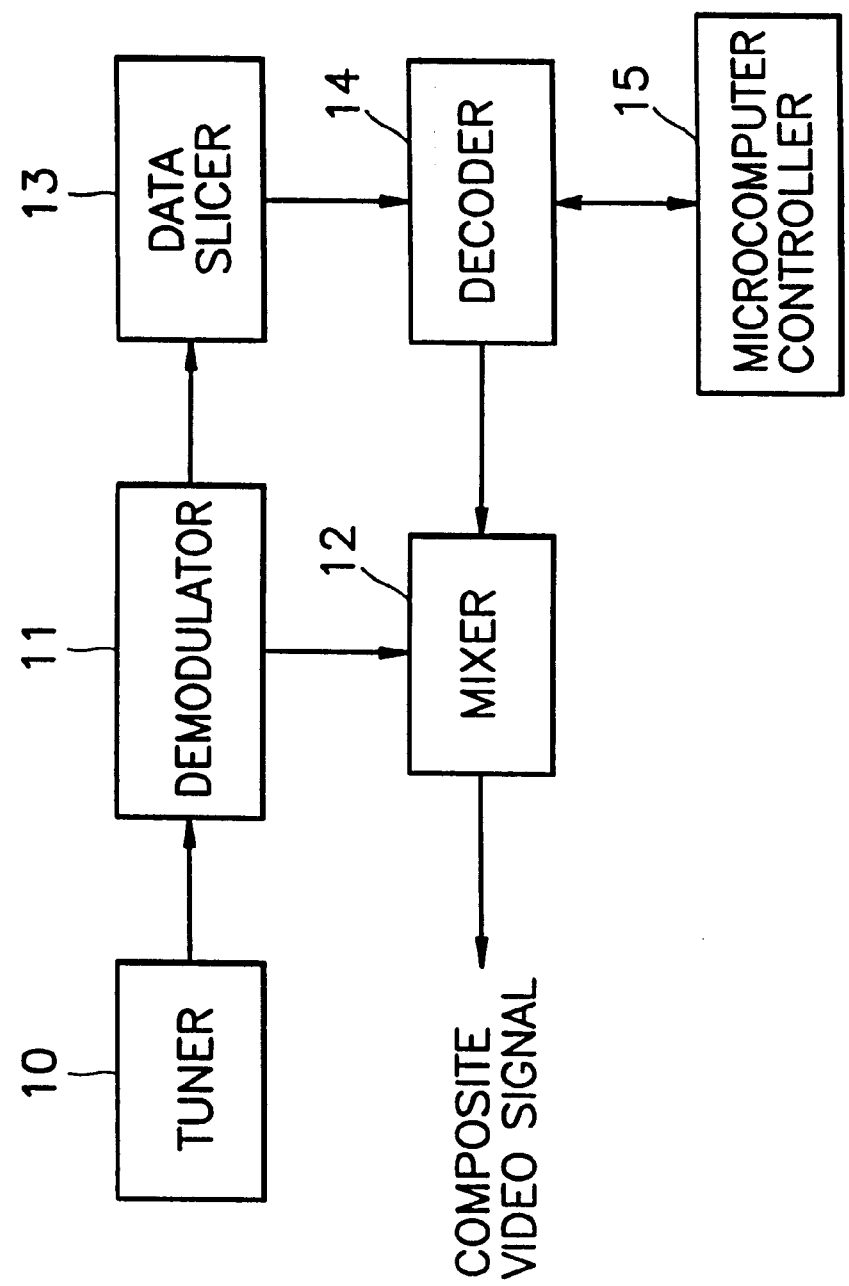
FIG. 1 is a block diagram for explaining a recording device using schedule data.

In FIG. 1, a TV broadcast program which is input through a tuner 10 and a radio frequency (RF) signal containing schedule data are demodulated in a demodulator 11 and output as a composite video signal.

A data slicer 13 separates the schedule data of a bit stream which exists in a predetermined scan line of a vertical blanking section from the composite video signal and outputs the separated schedule data to a decoder 14.

Here, the decoder 14 receives the schedule data of the bit stream under the control of a microcomputer controller 15, decodes the data into text which includes, for example, the title of the broadcast program, the broadcast station identification, the recording time and date, and outputs the decoded data to a mixer 12. At this time, the mixer 12 mixes the composite video signal output from the demodulator 11 and the decoded text data, that is, schedule data and outputs the mixed data.

Figure 2:
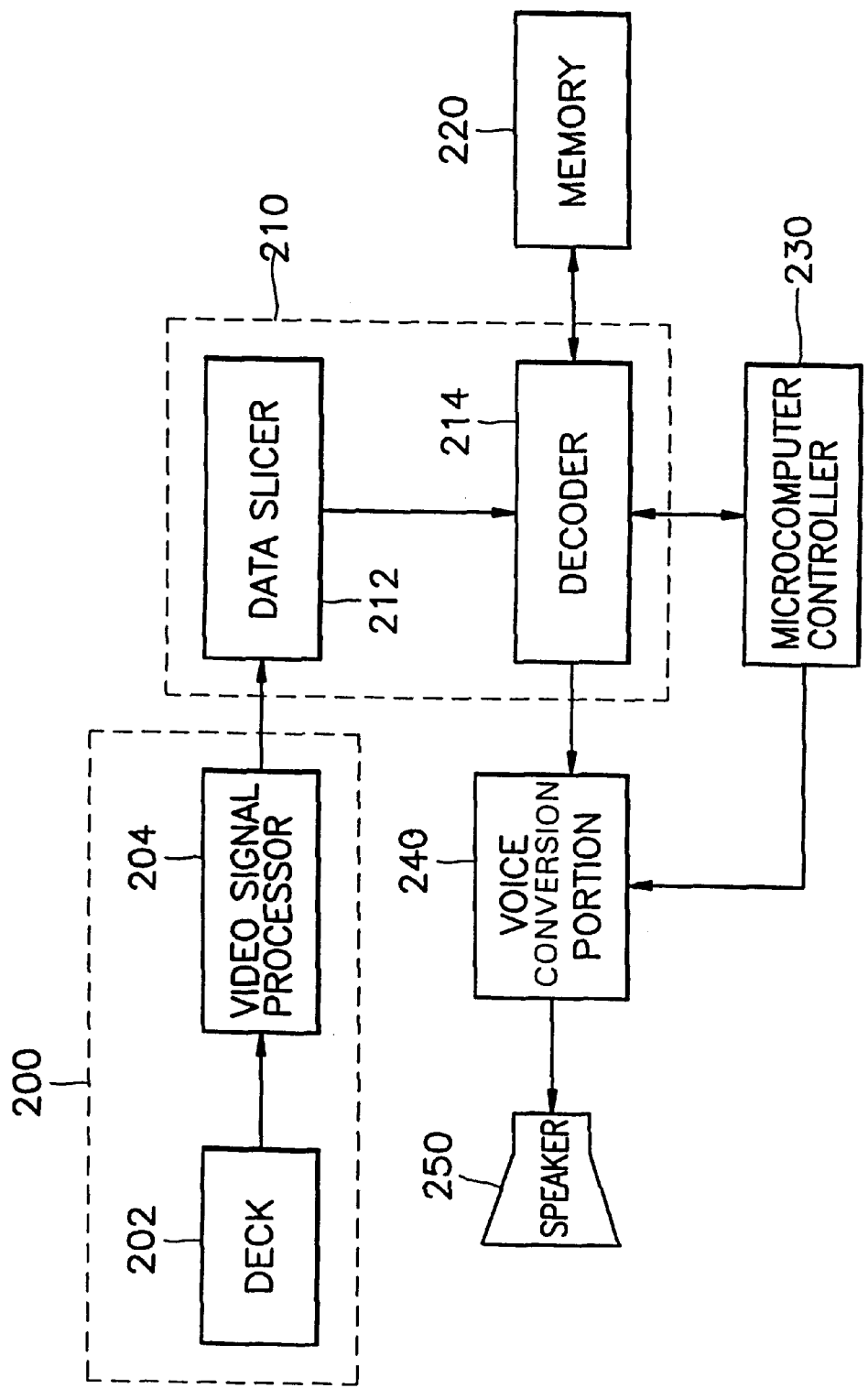
FIG. 2 is a block diagram for explaining a device for outputting recorded information as a voice message according to the present invention in a programmed recording system.

FIG. 2 is a block diagram for explaining a device for outputting recorded information as a voice message in a programmed recording system according to the present invention.

The device shown in FIG. 2 includes a video reproducing portion 200, a schedule data processor 210, a memory 220, a microcomputer controller 230, a voice conversion portion 240, and a speaker 250.

The video reproducing portion 200 includes a deck 202 for reproducing a video signal stored on a tape and a video signal processor 204 for signal-processing the reproduced video signal.

The schedule data processor 210 includes a data slicer 212 for separating the schedule data from the reproduced video signal and a decoder 214 for decoding the schedule data of the bit stream output from the data slicer 212 into text data.

Referring to FIG. 2, the schedule data together with a general video signal is stored on a tape and a video index search system (VISS) signal is automatically recorded by the deck 202 during recording. When the deck 202 reproduces and outputs the video signal including the recorded schedule data as a frequency modulation (FM) signal, the video signal processor 204 signal-processes the FM signal and outputs the processed signal as a composite video signal. The data slicer 212 separates the schedule data from the composite video signal and outputs the schedule data of the bit stream. The decoder 214 decodes the bit stream of the separated schedule data and outputs the text data which includes the recording date, the recording time, the broadcast station identification, and the title of the program. The memory 220 stores the text data output from the decoder 214 under the control of the microcomputer controller 230 and outputs the stored text data when it is necessary. The voice conversion portion 240 converts the text data decoded in the decoder 214 into a voice signal for output via the speaker 250. The stored text data including the schedule information may also be displayed on a display device based on the text data.

Figure 3:
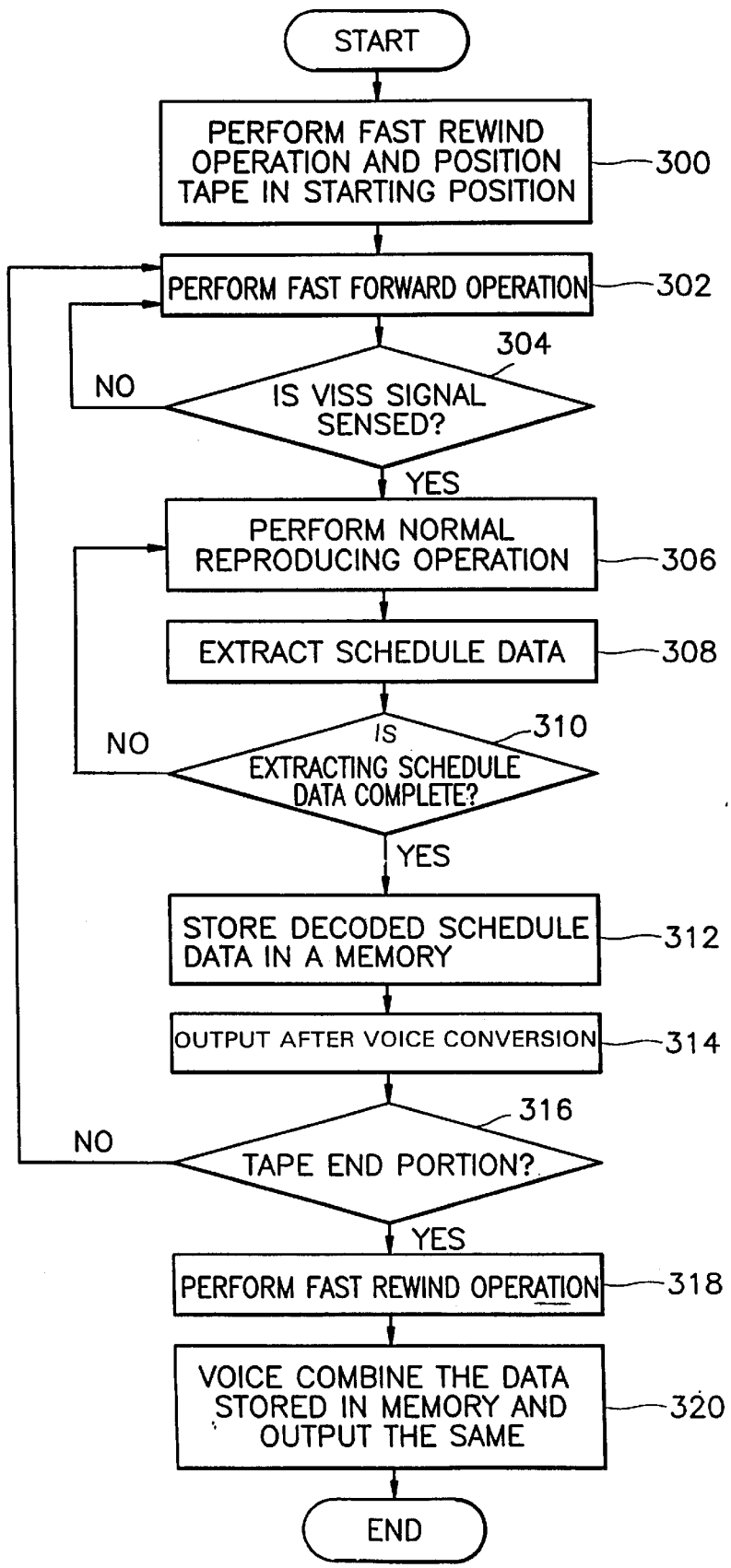
FIG. 3 is a flow chart for explaining a method of outputting recorded information as a voice message according to the present invention in a programmed recording system.

FIG. 3 is a flow chart illustrating a method for outputting recorded information as a voice message according to the present invention in a programmed recording system.

A fast rewinding (REW) operation is performed with respect to a recorded tape to position the tape at a starting position in step 300. Then, a fast forward winding (FFW) operation is performed with respect to a recorded tape and the VISS signal is searched for in step 302. When the VISS signal, which indicates the location at which each program is recorded, is located in step 304, the FFW operation is stopped and the video signal recorded at normal speed is reproduced in step 306 and the schedule data is extracted from the reproduced video signal in step 308. When the extraction of the schedule data is completed in step 310, the extracted schedule data is decoded and the text data such as the broadcasting identification (ID) and the recording date and time are stored in step 312. The text data is converted to a voice message and output in step 314. The stored text data including the schedule information may also be displayed on a display device based on the text data.

In case it is determined that the end portion of the tape is not detected in step 316, the FFW operation is performed and the VISS signal is searched for in order to confirm whether another program is recorded on the tape.

When the end portion of the tape is detected in step 316, the REW operation is performed in step 318. The text data stored in a memory is combined with a voice message, and the data such as the broadcasting station identification (ID) and the recording date and time are output as a voice or a combination of text and voice in step 320.

As described above, according to the present invention, each program recorded on a tape is searched for at high speed and schedule data recorded in a blanking section of the searched video signal is converted to voice information and is output as a voice message or a combination of voice and text. A user can easily confirm recording information such as the title of a program recorded on a tape, a broadcasting station identification (ID) of the program, a recording date, and recording time within a short period of time.

While preferred embodiments of the invention have been described above, modifications may be made by one skilled in the art to provide a method and device which do not depart from the spirit and scope of the present invention.

What is claimed is:

1. A device to output program schedule information recorded on a tape as a voice message in a programmed recording system using schedule data transmitted in a vertical blanking interval of a video frame, the device comprising:

(a.) a video reproducing portion for playing back a tape which stores a video signal containing the schedule data and outputting a composite video signal, said video reproducing portion playing back the tape from an initially rewound position in a fast forward mode to detect a first occurrence of a VISS signal, said VISS signal corresponding to a start location at which schedule data and a pre-recorded program is recorded, upon detection of said VISS signal, stopping said fast forward mode;

(b.) a schedule data processing portion for separating the located schedule data of the composite video signal output from said video reproducing portion and decoding the separated schedule data;

(c.) a voice conversion portion for converting the decoded schedule data output from said schedule data processing portion into audible program schedule data, the decoded schedule data including at least one of a title of a program, a broadcasting station identification of the program, a recording date of the program and a recording time of the program;

(d.) a speaker for outputting the audible program schedule data from said voice conversion portion; and (e.) a microcomputer controller for controlling said schedule data processing portion and said voice conversion portion;

(f.) resuming said fast forward mode to detect a next occurrence of a VISS signal, and upon detection of said next occurrence of said VISS signal repeating steps (b–e) until all occurrences of said VISS signal have been detected.

2. A device to output program schedule information as a voice message as claimed in claim 1, wherein said video reproducing portion comprises a deck for playing back said tape and for outputting a frequency modulation (FM) signal and a video signal processor for outputting the FM signal as said composite video signal.

3. A device to output program schedule information as a voice message as claimed in claim 1, wherein said schedule data processing portion includes a data slicer for separating the schedule data from the composite video signal and a decoder for decoding the separated schedule data.

4. A device to output program schedule information as a voice message as claimed in claim 3, further comprising a memory for storing the schedule data decoded in said decoder.

5. A method to output program schedule information recorded on a tape as a voice message in a programmed recording system using schedule data transmitted in a vertical blanking interval of a video frame, the method comprising:

(a.) playing back the tape from a rewound position in a fast forward mode to detect a first occurrence of a video index search system (VISS) signal, said VISS signal corresponding to a start location at which schedule data and a pre-recorded program is recorded, upon detection of said VISS signal, stopping said fast forward mode;

(b.) reproducing a video signal recorded on the tape at normal speed when said VISS signal is sensed;

(c.) separating the schedule data from said reproduced video signal and extracting the schedule data;

(d.) converting and outputting said extracted schedule data as a voice message;

(e.) resuming said fast forward mode to detect a next occurrence of a video index search system (VISS) signal and upon detecting said next occurrence of said VISS signal, repeating steps (b–e) until all occurrences of said VISS signal have been detected.

6. A method to output program schedule information recorded on a tape as a voice message as claimed in claim 5 further comprising: positioning a tape at a start position prior to searching for the VISS.

7. A method to output program schedule information recorded on a tape as a voice message as claimed in claim 6, wherein said positioning is performed by rewinding the tape.

8. A method to output program schedule information recorded on a tape as a voice message as claimed in claim 5 further comprising a fast forward operation, said fast forward operation being performed while searching for the VISS signal recorded on the tape.

9. A method to output program schedule information recorded on a tape as a voice message as claimed in claim 5, further comprising: determining whether an end portion of the tape is reached, wherein when the end portion of the tape is not detected, the VISS searching operation is performed in order to search for another recorded program.

10. A method to output program schedule information recorded on a tape as a voice message as claimed in claim 9, further comprising a fast forward operation, said fast forward operation being performed while searching for the VISS signal recorded on the tape.

11. A method to output program schedule information recorded on a tape as a voice message as claimed in claim 10, further comprising: positioning the tape at a start position by rewinding the tape.

12. A method to output program schedule information recorded on a tape as a voice message as claimed in claim 5, further comprising means for storing said extracted schedule data to be output, independent from said reproduced video signal, at a later time.

* * * * *